R. & W. STIPE.
STEERING GEAR FOR SURFACING MACHINES.
APPLICATION FILED OCT. 28, 1909.
984,450.  Patented Feb. 14, 1911.
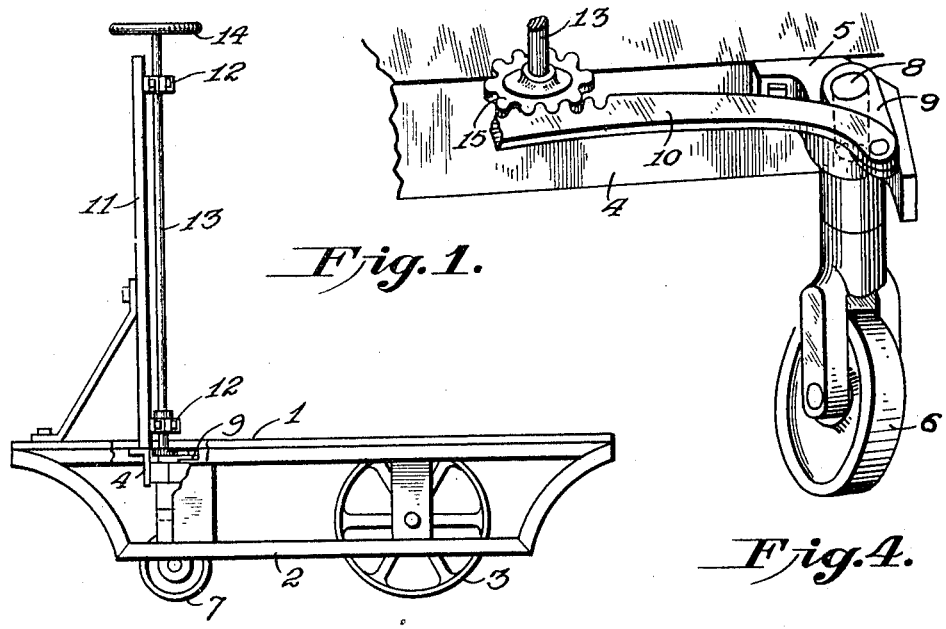
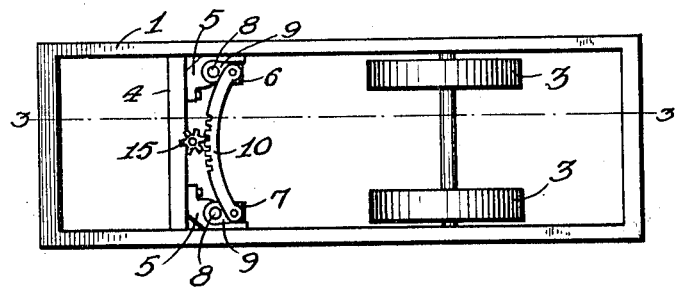
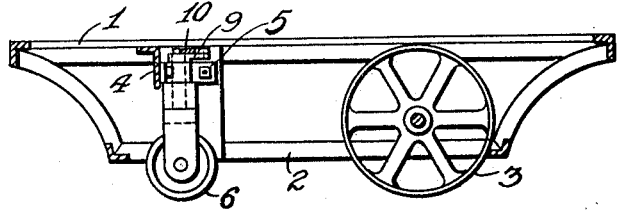
Witnesses  
Everett Lancaster  
H. Joseph Doyle
Inventors  
Robert Stipe,  
William Stipe,  
By E. E. Vrooman,  
Attorney.

UNITED STATES PATENT OFFICE.

ROBERT STIPE AND WILLIAM STIPE, OF OAKLAND, CALIFORNIA, ASSIGNORS OF ONE-FOURTH TO A. J. BOITANO, OF OAKLAND, CALIFORNIA, AND ONE-FOURTH TO LOUISE D. FIELD, OF SAN FRANCISCO, CALIFORNIA.

STEERING-GEAR FOR SURFACING-MACHINES.

984,450.  Specification of Letters Patent.  Patented Feb. 14, 1911.

Original application filed April 6, 1909, Serial No. 488,216. Divided and this application filed October 28, 1909. Serial No. 525,132.

*To all whom it may concern:*

Be it known that we, ROBERT STIPE and WILLIAM STIPE, citizens of the United States, residing at Oakland, in the county of Alameda and State of California, have invented certain new and useful Improvements in Steering-Gear for Surfacing-Machines, of which the following is a specification, reference being had therein to the accompanying drawing.

This invention relates to steering gears especially adapted for surfacing machines, and the principal object of the same is to provide means whereby an operator standing upon the platform may readily steer the machine so that all portions of the surface being treated may be operated upon by the machine.

In carrying out the object of the invention generally stated above it will be understood, of course that the essential features of the same are necessarily susceptible of changes in details and structural arrangements, a preferred and practical embodiment of which is shown in the accompanying drawings, wherein:—

Figure 1 is a view in side elevation of the frame of a surfacing machine equipped with the improved steering gear. Fig. 2 is a top plan view, the operating shaft and its supporting standard being omitted. Fig. 3 is a vertical sectional view taken on the line 3—3, Fig. 2. Fig. 4 is a detail perspective view of the improved steering gear shown separated from the frame of the machine.

In the accompanying drawings only enough of a surfacing machine has been shown to fully illustrate the applicability thereto of the improved steering gear, said frame being identical in all respects with that shown in our application, Serial Number 488,216, filed April 6, 1909, of which the present application is a division.

Referring to said drawings by numerals, 1 designates the platform portion of the frame and 2 the pendent vertical sides thereof, said frame being preferably formed of angle irons, and whose rear portion is supported by the wheels 3 which may be the propelling wheels. Adjacent its forward end, the said platform portion 1 is provided with a transverse bar 4, preferably of metal and angular shape, each end of said bar carrying a bracket bearing 5.

The steering rollers 6—7 are in the form of casters, one being located to each side of the forward end of the platform 1 and having their vertically arranged shaft 8 projected through the bracket bearings 5 and equipped with a crank arm 9, said crank arms being connected by the outwardly bowed rack bar 10.

A vertical standard 11 is carried by the forward end of the platform portion 1, said standard being adapted to support the usual dust receptacle (not shown) and being provided with regularly spaced apart, vertically arranged bearings 12 for the vertical steering shaft 13 whose upper end is equipped with a hand wheel 14. The lower end of said shaft 13 has a pinion 15 fast thereon that is in mesh with the rack bar 10.

From the foregoing it will be seen that by manipulating the hand wheel 14, the pinion 15 will move the rack bar 10 transversely of the frame and through the crank connections 9 with the steering rollers, said rollers may be readily swung to the right or left to control the direction of travel of the machine.

It will be seen that by having the roller bracket mounted at the junction of the bar 4 with the sides of the frame, the brackets and rollers are held beneath the frame and are thus saved from being injured by coming in contact with any article.

What we claim as our invention is:—

A device of the character described comprising a frame composed of angle irons, an angle iron transversely mounted intermediate the length of said frame, a bracket bearing mounted at the junction of each end of said transverse angle iron with said frame, a roller shaft rotatably mounted in each of said bracket bearings and protruding above the upper surfaces thereof, a crank arm secured to the upper end of each of said shafts, a rack bar secured to said crank arms and a steering mechanism meshing with said rack bar.

In testimony whereof we hereunto affix our signatures in presence of two witnesses.

ROBERT STIPE.
WILLIAM STIPE.

Witnesses:
H. C. SCHROEDER,
A. J. BOITANO.